United States Patent
Robinson

(10) Patent No.: US 7,596,905 B2
(45) Date of Patent: Oct. 6, 2009

(54) SELF WATERING PLANT HANGER

(76) Inventor: David Robinson, 6878 Serenity Farm Rd., Rt. 231, Benedict, MD (US) 20612

( * ) Notice: Subject to any disclaimer, the term of this patent is extended or adjusted under 35 U.S.C. 154(b) by 696 days.

(21) Appl. No.: 11/397,636

(22) Filed: Apr. 5, 2006

(65) Prior Publication Data

US 2007/0234639 A1    Oct. 11, 2007

(51) Int. Cl.
*A01G 29/00* (2006.01)
*A47G 7/00* (2006.01)
*A47G 7/02* (2006.01)
*A01G 25/00* (2006.01)

(52) U.S. Cl. ................. 47/48.5; 47/39; 47/79; 47/67

(58) Field of Classification Search .......... 47/48.5, 47/67, 40.5, 82, 79; 248/154, 220.21, 146; 222/465.1, 478
See application file for complete search history.

(56) References Cited

U.S. PATENT DOCUMENTS

| | | | | |
|---|---|---|---|---|
| 3,054,210 A | * | 9/1962 | Kratzer et al. | 239/654 |
| 3,900,134 A | * | 8/1975 | Larson | 222/52 |
| 4,060,934 A | * | 12/1977 | Skaggs | 47/79 |
| 4,392,594 A | * | 7/1983 | Swett et al. | 222/530 |
| 4,760,666 A | * | 8/1988 | Han | 47/79 |
| 4,825,591 A | | 5/1989 | Han | |
| 4,848,029 A | * | 7/1989 | Han | 47/79 |
| 5,052,149 A | * | 10/1991 | Johnson | 47/67 |
| 5,062,239 A | * | 11/1991 | Helton | 47/79 |
| 5,315,787 A | | 5/1994 | Schleicher, I et al. | |
| 5,921,443 A | | 7/1999 | McMillan | |
| 6,173,530 B1 | * | 1/2001 | Holt | 47/66.1 |
| 2002/0116870 A1 | | 8/2002 | Chen | |
| 2004/0251282 A1 | * | 12/2004 | Butler | 222/383.1 |
| 2005/0051231 A1 | * | 3/2005 | Harding | 141/2 |

* cited by examiner

*Primary Examiner*—Michael R Mansen
*Assistant Examiner*—Monica L Williams
(74) *Attorney, Agent, or Firm*—Richard C. Litman

(57) ABSTRACT

An automatic watering and fertilizing device in the form of a large watering can having a spout. The device incorporates a battery-powered timer dispenser that can be programmed to dispense a desired water fertilizer mixture. A plastic drum is housed in the watering can and contains the water fertilizer mixture. The drum contains enough mixture to feed the plants for approximately one week. A quick connect hose is utilized to refill the drum. Refilling the drum is the only regular maintenance required. A plant basket is suspended from the spout of the watering can. The device is adapted to be secured to a supporting object such as a post or a wall.

11 Claims, 5 Drawing Sheets

SELF WATERING PLANT HANGER

BACKGROUND OF THE INVENTION

1. Field of the Invention

The present invention generally relates to automatic watering devices. More specifically, the present invention is drawn to a self-watering device for a hanging plant.

2. Description of the Related Art

It has become highly fashionable to display hanging plants in homes, offices, restaurants, hotels, etc. Hanging plants are aesthetically pleasing and add a bit of "feng shui" to the particular environment. Plants, however do require attention or they will wither and die, thus defeating the intended aesthetic purpose. The most common causes of plant deterioration are lack of watering, overwatering and improper fertilizer dosage. Performing these functions requires time and consistency. Hiring nursery people entails expense. The art would certainly welcome an automatic plant watering and fertilizing device that requires minimum maintenance and is aesthetically compatible with the plant. Thus, a self-watering plant hanger solving the aforementioned problems is desired.

The related art is awash with automatic plant watering devices. Pertinent samples of such devices are cited and identified in the accompanying IDS. However, none of the cited and identified related art, taken either singly or in combination, is seen to disclose the invention as will subsequently be described and claimed.

SUMMARY OF THE INVENTION

The present invention comprises an automatic watering and fertilizing device in the form of a large watering can having a spout. The device incorporates a battery-powered timer dispenser that can be programmed to dispense a desired water fertilizer mixture. A plastic drum is housed in the watering can and contains the water fertilizer mixture. The drum contains enough mixture to feed the plants for approximately one week. A quick connect hose is utilized to refill the drum. Refilling is the drum is the only regular maintenance required. A plant basket is suspended from the spout of the watering can. The device is adapted to be secured to a supporting object such as a post or a wall.

Accordingly, the invention presents an automatic watering and fertilizing system complete with a means to suspend a plant basket therefrom. The system is aesthetically pleasing, substantially self-contained and requires minimum maintenance. The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
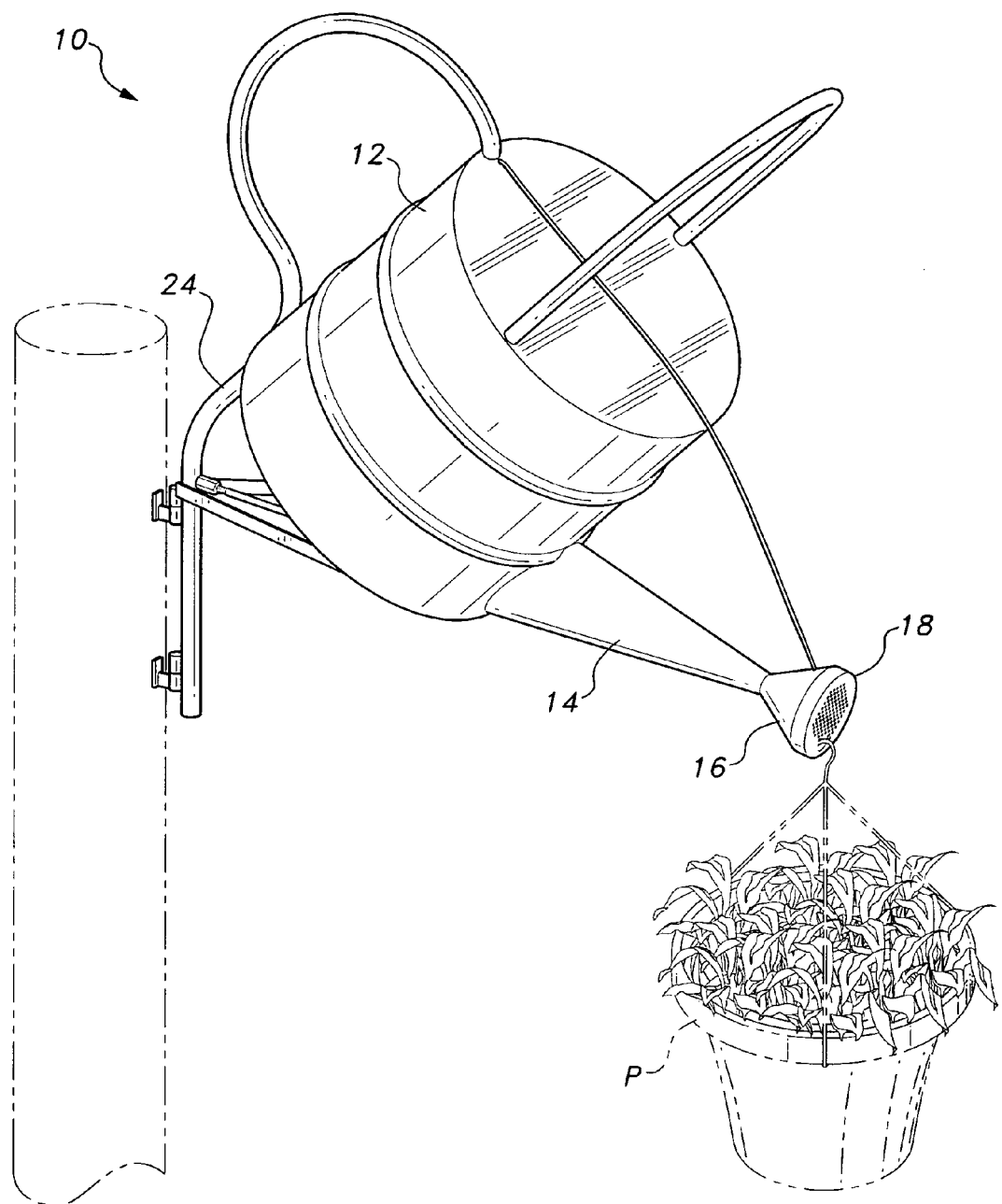
FIG. 1 is an environmental, perspective view of a self-watering plant hanger according to the present invention.

Attention is first directed to FIG. 1 wherein the self-watering plant hanger of the present invention is generally indicated at 10. Self-watering plant hanger 10 comprises a hollow, open-bottom, decorative water can 12 having a spout 14 attached thereto. Spout 14 terminates in a flared open end 16. A decorative cap 18, having at least one opening therein, is removably mounted on the end 16. A thin support wire 20 (see FIG. 2) is disposed in end 16. Wire 20 functions to support a basket of plants P disposed below end 16. Although metal is preferred, water can 12, spout 14, cap 18 and wire 20 may be fabricated from a suitable plastic material if desired.

Figure 2:
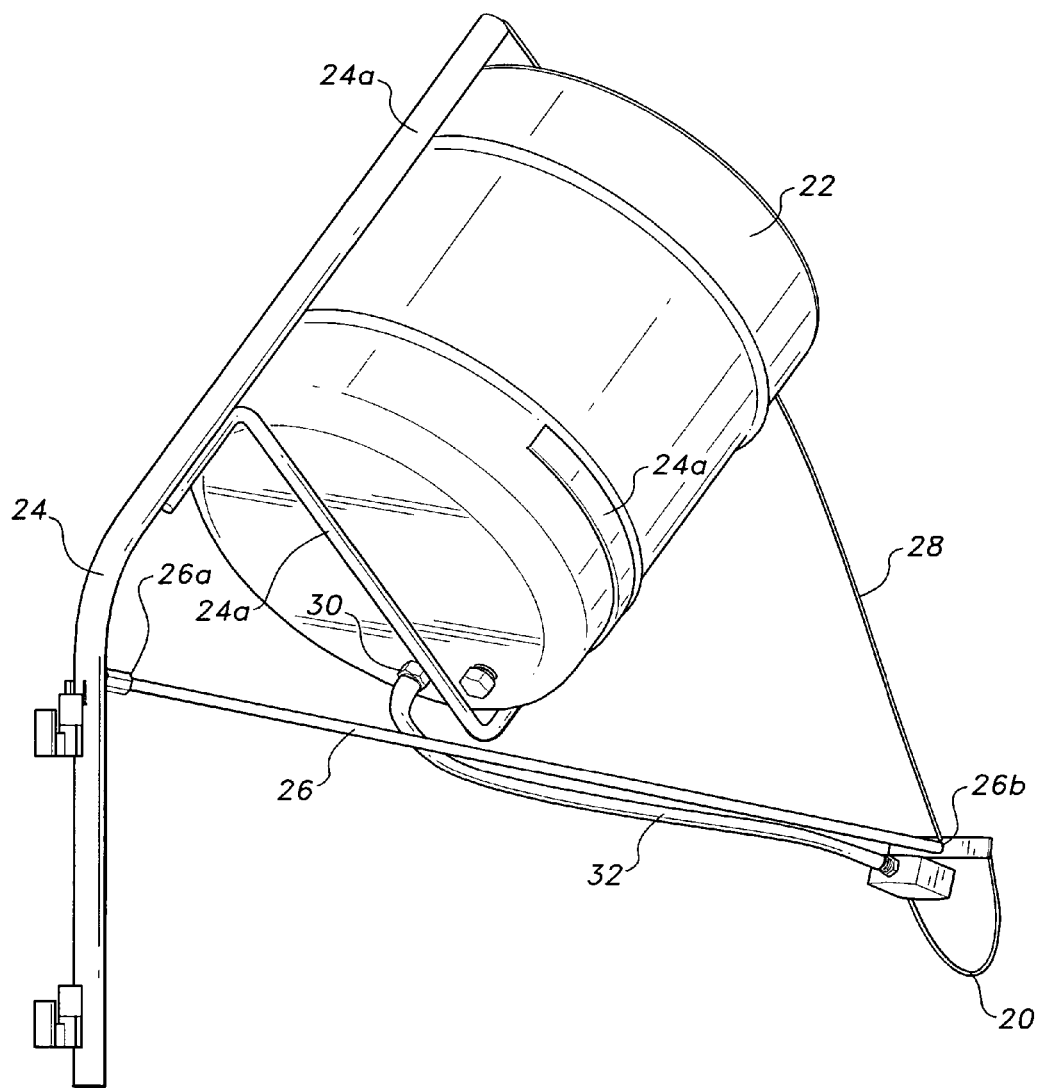
FIG. 2 is a partial, perspective bottom view of a drum and support bracket of a self-watering plant hanger according to the present invention.
Figure 3:
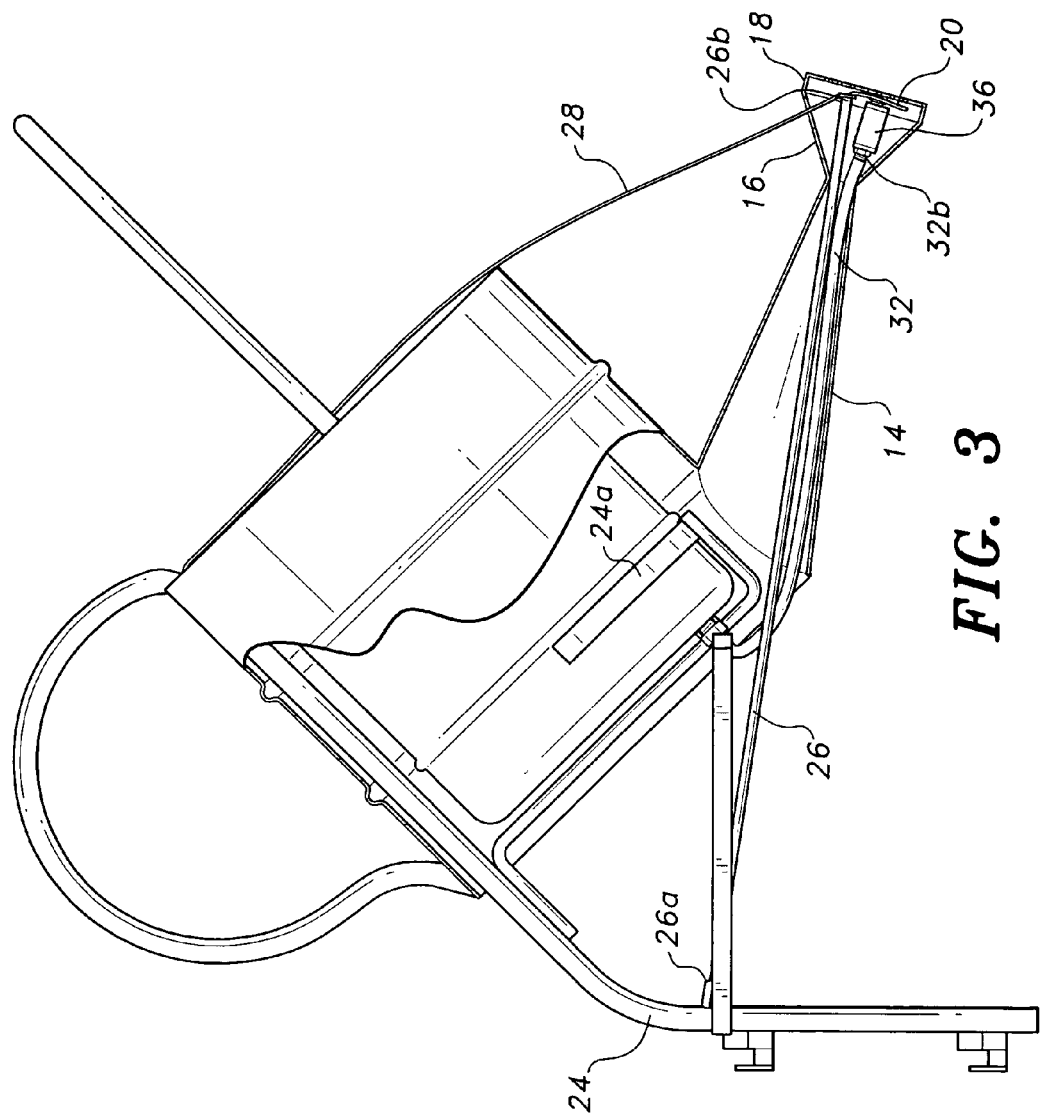
FIG. 3 is a partial, perspective side view of a drum and support bracket of a self-watering plant hanger according to the present invention.
Figure 4:
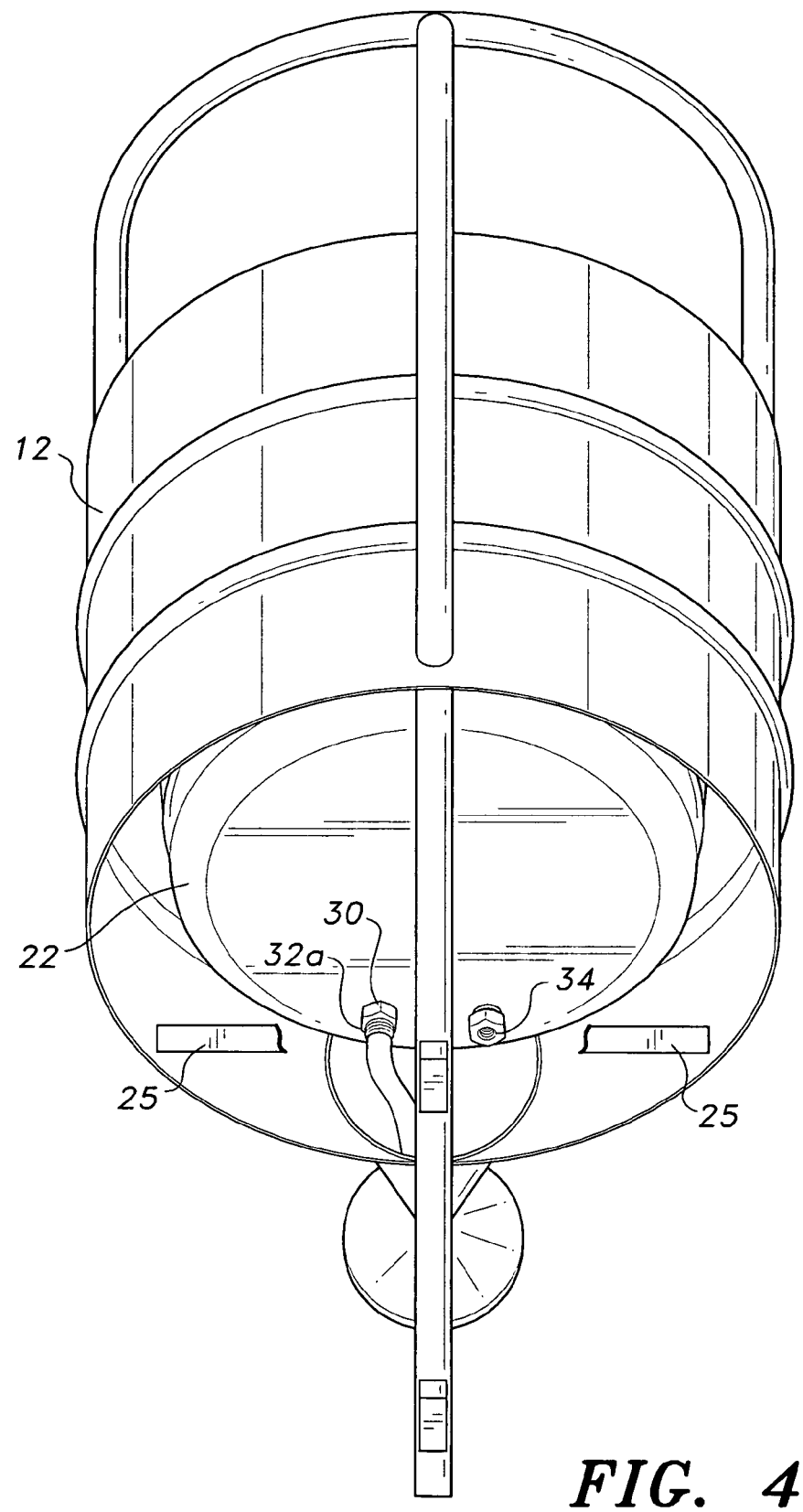
FIG. 4 is a bottom view of a self-watering plant hanger according to the present invention.

As best seen in FIGS. 2-4, a plastic container 22 is housed within the interior of hollow can 12. Container 22 is supported on a bracket 24. Bracket is provided with arms 24a for supporting container 22 in a canted orientation. A wind brace 25 extends across the bottom of container 22 and is removably attached to container 22 and the inner wall of can 12. The bracket 24 is attached to a fixed object such as a wall or a post and is adapted to support the can and container from such fixed object. Water can 12 is disposed to encapsulate container 22 therein except at the bottom. The bottom of the can is open to provide easy access to container 22 for refilling as will be more fully explained below. A support rod 26 has a distal end 26a attached to bracket 24. Support rod 26 extends through spout 14. The proximate end 26b of support rod 26 terminates in the open end 16 of spout 14. A support cable 28 is attached at one end to the proximate end 26b of support rod 26. Wire 20 is also attached to end 26b. The support cable extends through an opening in the wall of end 16. The other end of support cable 28 is attached to an upper arm of the bracket 24.

Figure 5:
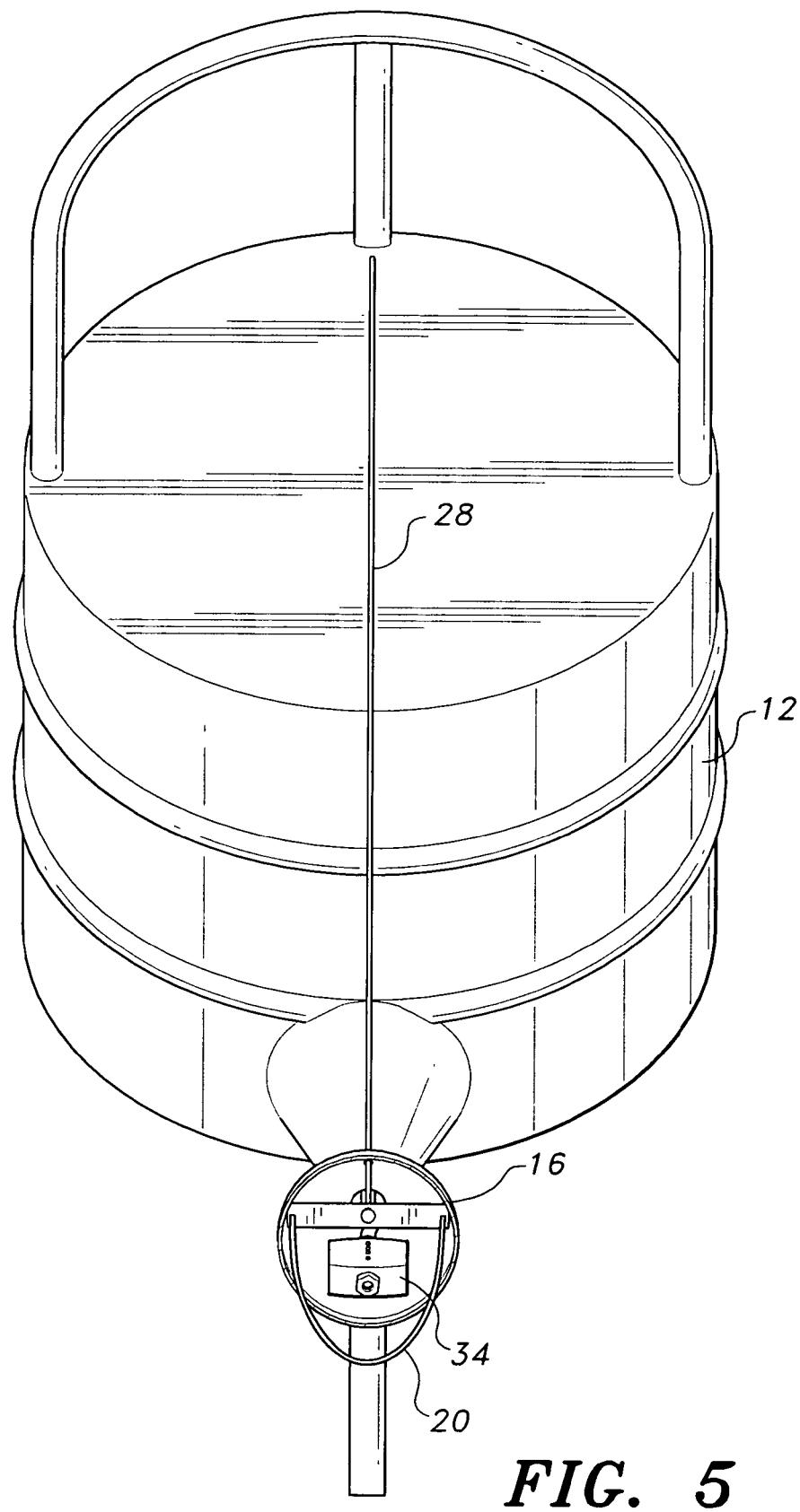
FIG. 5 is a partial, front view of a self-watering plant hanger according to the present invention.

The bottom of container 22 is provided with a threaded opening 30. Opening 30 is adapted to receive one end 32a of a supply hose 32. Supply hose 32 also extends through spout 14 and terminates at 32b in the flared end 16. A quick-connect opening 34 is provided to receive the end of a refill hose (not shown) for replenishing a solution of water and fertilizer to container 22. A battery powered timer dispenser 36 (FIG. 5) is attached to end 32b of supply hose 32. Dispenser 36 is positioned in end 16 and can be programmed to allow the water/fertilizer solution to flow from hose 32 at selected intervals. The solution flows from dispenser 36 via end 16 and cap 18 into the plant basket P.

It is to be understood that the present invention is not limited to the embodiment described above, but encompasses any and all embodiments within the scope of the following claims.

I claim:

1. A self-watering plant hanger, comprising:
   a decorative water can, said water can having an interior volume and an open bottom;
   a spout extending from said water can, said terminating as a flared open end;
   a decorative cap removably positioned on said flared open end said decorative cap having at least one opening therein,
   a fluid filled container disposed in said interior volume of said water can, said container having a bottom wall;
   a supply opening disposed in said bottom wall;

a supply hose, said supply hose having a first end connected to said supply opening and a second end terminating in said flared open end; and a support for a plant basket, said support attached at said flared open end, wherein said support for said plant basket comprises a wire attached at said flared open end.

2. The self-watering plant hanger according to claim 1, further including a bracket, said bracket having arms for supporting said container in said water can.

3. The self-watering plant hanger according to claim 1, further including a dispenser disposed in said flared open end, said dispenser connected to said second end of said hose.

4. The self-watering plant hanger according to claim 3, wherein said dispenser includes a battery operated, programmable timer.

5. The self-watering plant hanger according to claim 1, including a quick-connect fill opening disposed in said bottom wall.

6. A self-watering plant hanger, comprising:
- a decorative water can, said water can having an interior volume and an open bottom;
- a spout extending from said water can, said terminating as a flared open end;
- a decorative cap removably positioned on said flared open end said decorative cap having at least one opening therein;
- a fluid filled container disposed in said interior volume of said water can, said container having a bottom wall;
- a supply opening disposed in said bottom wall;
- a supply hose, said supply hose having a first end connected to said supply opening and a second end terminating in said flared open end;
- a bracket, said bracket having arms for supporting said container in said water can; and
- a wire for supporting a plant basket, said wire disposed at said flared open end.

7. The self-watering plant hanger according to claim 6, further including a support rod extending through said spout, said support rod having a distal end and a proximate end, wherein said distal end is attached to said bracket and said proximate end terminates in said flared open end, said wire being attached to said proximate end.

8. The self-watering plant hanger according to claim 7 further including a support cable, said support cable having a first end attached to the proximate end of said support rod and a second end attached to said bracket.

9. The self-watering plant hanger according to claim 8, further including a dispenser disposed in said flared open end, said dispenser connected to said second end of said hose.

10. The self-watering plant hanger according to claim 9, wherein said dispenser includes a battery operated, programmable timer.

11. The self-watering plant hanger according to claim 10, including a quick-connect fill opening disposed in said bottom wall.

\* \* \* \* \*